(12) United States Patent  (10) Patent No.: US 8,805,353 B2
Shin  (45) Date of Patent: Aug. 12, 2014

(54) SYSTEM TO PROVIDE ENTERTAINMENT IN ASSOCIATION WITH TELECOMMUNICATION SERVICE

(75) Inventor: Hyun-coog Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1385 days.

(21) Appl. No.: 12/117,956

(22) Filed: May 9, 2008

(65) Prior Publication Data

US 2009/0069002 A1  Mar. 12, 2009

(30) Foreign Application Priority Data

Sep. 7, 2007  (KR) .......................... 10-2007-0091115

(51) Int. Cl.
*H04M 3/00* (2006.01)
(52) U.S. Cl.
USPC ..................... 455/419; 455/556.1; 455/414.1; 455/466; 455/566; 455/567; 725/109; 348/734
(58) Field of Classification Search
USPC .................. 348/734; 455/419, 555, 566, 567, 455/556.1, 414.1, 466; 725/60, 61, 136, 725/109
See application file for complete search history.

(56) References Cited

U.S. PATENT DOCUMENTS

| 6,400,280 | B1* | 6/2002 | Osakabe ..................... 340/4.41 |
| 2005/0278767 | A1* | 12/2005 | Ahluwalia .................... 725/109 |
| 2006/0040638 | A1* | 2/2006 | McQuaide .................... 455/403 |
| 2007/0121606 | A1* | 5/2007 | Scheinert ..................... 370/356 |
| 2008/0278635 | A1* | 11/2008 | Hardacker et al. ............ 348/734 |

FOREIGN PATENT DOCUMENTS

| JP | 2003-87364 | 3/2003 |
| KR | 2000-17534 | 9/2000 |
| KR | 2005-88603 | 9/2005 |
| KR | 10-2006-0057699 | 5/2006 |
| KR | 10-2006-0132098 | 12/2006 |
| KR | 10-2007-0003314 | 1/2007 |
| WO | 2005-25194 | 3/2005 |

OTHER PUBLICATIONS

Office Action issued in Korean Application No. 10-2007-0091115 on Sep. 10, 2013.

* cited by examiner

*Primary Examiner* — Wayne Cai
(74) *Attorney, Agent, or Firm* — Stanzione & Kim, LLP (57) ABSTRACT

A method to provide an entertainment service in connection with a telecommunication service includes transmitting by a remote control apparatus transmits a first control command to operate an electronic device providing an entertainment service to an electronic device while a user uses a telecommunication service, and transmitting a second control command associated with the telecommunication service transmitted from a telecommunication device to the electronic device. Therefore, a user enjoying an entertainment service can more conveniently use a telecommunication service.

23 Claims, 7 Drawing Sheets

| Header | Data Length | Data | Checksum |
|---|---|---|---|

FIG. 6B

| Leader Pulse | Custom Code | Data Code |
|---|---|---|

FIG. 6C

| Leader Pulse | ID | Data Length | Data Code |
|---|---|---|---|

FIG. 7

SYSTEM TO PROVIDE ENTERTAINMENT IN ASSOCIATION WITH TELECOMMUNICATION SERVICE

CROSS-REFERENCE TO RELATED APPLICATIONS

This application claims priority under 35 U.S.C. §119 (a) from Korean Patent Application No. 10-2007-0091115, filed on Sep. 7, 2007, in the Korean Intellectual Property Office, the disclosure of which is incorporated herein by reference in its entirety.

BACKGROUND OF THE INVENTION

1. Field of the Invention

The present general inventive concept relates to a system to provide entertainment, and more particularly, to a system to provide a user with entertainment such as video or audio.

2. Description of the Related Art

As video technology and home network apparatuses have been developed, users today enjoy various entertainments at home.

The entertainment includes movies, broadcasting, pictures, music, and so on. While a user is enjoying a movie, broadcasting, or music accompanying sound, the user may miss a phone call by not hearing a telephone ringing due to output sound. The user also may miss the phone call when a telephone is vibrating.

The user also experiences inconvenience even if he or she hears the phone ringing because the user has to get to the phone, and lower a volume of home apparatuses.

SUMMARY OF THE INVENTION

The present general inventive concept provides an entertainment service in association with a telecommunication service so that a user enjoying the entertainment service can more conveniently use the telecommunication service.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a remote control apparatus usable with a telecommunication and entertainment system, the apparatus including a first interface to receive a telecommunication service from a telecommunication device to provide a user with the telecommunication service, a second interface connected with an electronic device to provide the user with an entertainment service for communication, and a controller to transmit a first control command to the electronic device through the second interface to operate the electronic device while the user uses the telecommunication service, and to transmit a second control command associated with the telecommunication service transmitted from the telecommunication device through the first interface to the electronic device through the second interface.

The second control command may include at least one of a field indicating a type of the second control command and a field containing data required to conduct the second control command.

A format of the second control command may be derived from a format of the first control command.

A first field of the first control command may be identical to a first field of the second control command.

The second interface may transmit the first control command and the second control command to the electronic device using one of an infrared signal and a radio frequency (RF) signal.

The telecommunication service may include a voice telephony service and a short message service (SMS), and the telecommunication device may include a general telephone and a mobile phone.

The first interface may be connected with the telecommunication device for communication according to one of a Bluetooth hands free profile and a Bluetooth cordless telephony profile (CTP).

The foregoing and/or other aspects and utilities of the present general inventive concept may also be achieved by providing a remote control apparatus usable with a telecommunication and entertainment system, the apparatus including an input unit to receive a command from a user, a first interface to receive a telecommunication service from a telecommunication device to provide the user with the telecommunication service, a second interface connected with an electronic device to provide the user with an entertainment service, and a controller to transmit a portion of the telecommunication service received from the telecommunication device through the first interface to the electronic device through the second interface, and if a command is input through the input unit, to transmit remaining portions of the telecommunication service to the electronic device through the second interface.

The portion of the telecommunication service may include information about a caller of the telecommunication service, and other portions of the telecommunication service include telecommunication content transmitted by the caller.

The second control command may include at least one of a field indicating a type of the second control command and a field containing data required to conduct the second control command.

A format of the second control command may be derived from a format of the first control command.

A first field of the first control command may be identical to a first field of the second control command.

The telecommunication service may include a short message service (SMS).

The foregoing and/or other aspects and utilities of the present general inventive concept may also be achieved by providing a remote control method, including transmitting a portion of a telecommunication service received from a telecommunication device to an electronic device, and if a user inputs a command, transmitting remaining portions of the telecommunication service to the electronic device.

The foregoing and/or other aspects and utilities of the present general inventive concept may also be achieved by providing an electronic apparatus including a function block to provide a user with an entertainment service, an interface connected with a remote control apparatus to receive a telecommunication service from a telecommunication device for communication, and a controller to control the function block in order to conduct a first control command, if the first control command input by a user is received from the remote control apparatus through the interface, and to control the function block in order to conduct a second control command, if the second control command associated with the telecommunication service is received from the remote control apparatus through the interface.

The foregoing and/or other aspects and utilities of the general inventive concept may also be achieved by providing a remote control apparatus usable with a telecommunication system and an entertainment system, the apparatus including an interface to receive telecommunication information corresponding to a telecommunication service, and a controller to control an operation of the entertainment system to stop providing an entertainment service and to transfer at least a portion of the telecommunication information to the entertainment system, wherein a user obtains the at least a portion of the telecommunication information through the entertainment system.

The foregoing and/or other aspects and utilities of the general inventive concept may also be achieved by providing a remote control apparatus usable with a telecommunication system, the apparatus including an interface to receive telecommunication service from one or more telecommunication devices, and a controller to transmit a first set of telecommunication information corresponding to the telecommunication service to an electronic device and to transmit a second set of telecommunication information thereto in response to a user command.

The user command may be in response to the first set of telecommunication information.

The first set of telecommunication information may include a call message.

The foregoing and/or other aspects and utilities of the general inventive concept may also be achieved by providing a remote control method of a telecommunication system and an entertainment system, the method including receiving telecommunication information corresponding to a telecommunication service, and controlling an operation of the entertainment system to stop providing an entertainment service and to transfer at least a portion of the telecommunication information to the entertainment system so that a user obtains the at least a portion of the telecommunication information through the entertainment system.

The foregoing and/or other aspects and utilities of the general inventive concept may also be achieved by providing a computer-readable recording medium having embodied thereon a computer program to execute a method, wherein the method includes receiving telecommunication information corresponding to a telecommunication service, and controlling an operation of an entertainment system to stop providing an entertainment service and to transfer at least a portion of the telecommunication information to the entertainment system so that a user obtains the at least a portion of the telecommunication information through the entertainment system.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
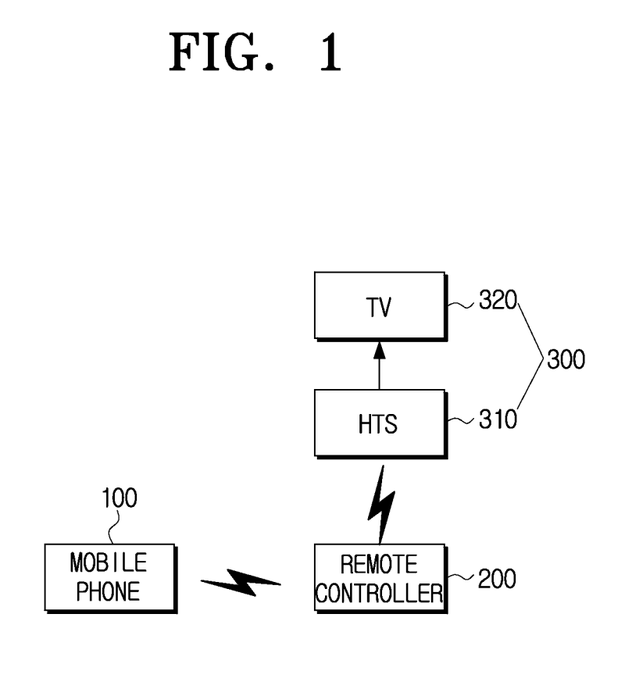
FIG. 1 is a block diagram illustrating a system applicable to the present general inventive concept.

FIG. 1 is a block diagram illustrating a system applicable to the present general inventive concept. The system provides a user with entertainment in association with the telecommunication service. The system stops providing the entertainment while the user uses the telecommunication service.

Referring to FIG. 1, the system may include a mobile phone 100, a remote controller 200, and an entertainment system 300 connected with each other for communication.

The entertainment system 300 includes a home theater system (HTS) 310 and a television (TV) 320 connected with each other to provide a user with entertainment including video and audio. The connection between HTS 310 and the TV 320 may be composite, component, high definition multimedia interface (HDMI), S-video, digital visual interface (DVI), etc.

The mobile phone 100 receives a telecommunication service through a base station, and provides a user with the received telecommunication service. A voice telephony service and a short message service (SMS) are typical examples of the telecommunication services provided by the mobile phone 100 to a user.

The mobile phone 100 may provide a user with a telecommunication service via the remote controller 200, in addition to directly providing the user with the telecommunication service. Therefore, the mobile phone 100 is connected with the remote controller 200, for example, in a Bluetooth communication.

The remote controller 200 remotely transmits a user command to the entertainment system 300 via an infrared data association (IrDA). Accordingly, the user controls an operation of the entertainment system 300 using the remote controller 200.

The remote controller 200 may directly provide a user with the voice telephony service received from the mobile phone 100. That is, the user may use the remote controller 200 to establish telecommunication.

When a telecommunication service is received from the mobile phone 100, the remote controller 200 controls the operation of the entertainment system 300 to stop providing the entertainment service. The remote controller 200 transfers information of the received telecommunication service to the entertainment system 300. The information of the received telecommunication service is provided to the user through the entertainment system 300.

If the telecommunication service finishes, the remote controller 200 controls the operation of the entertainment system 300 so that the entertainment service can continue.

Figure 2:
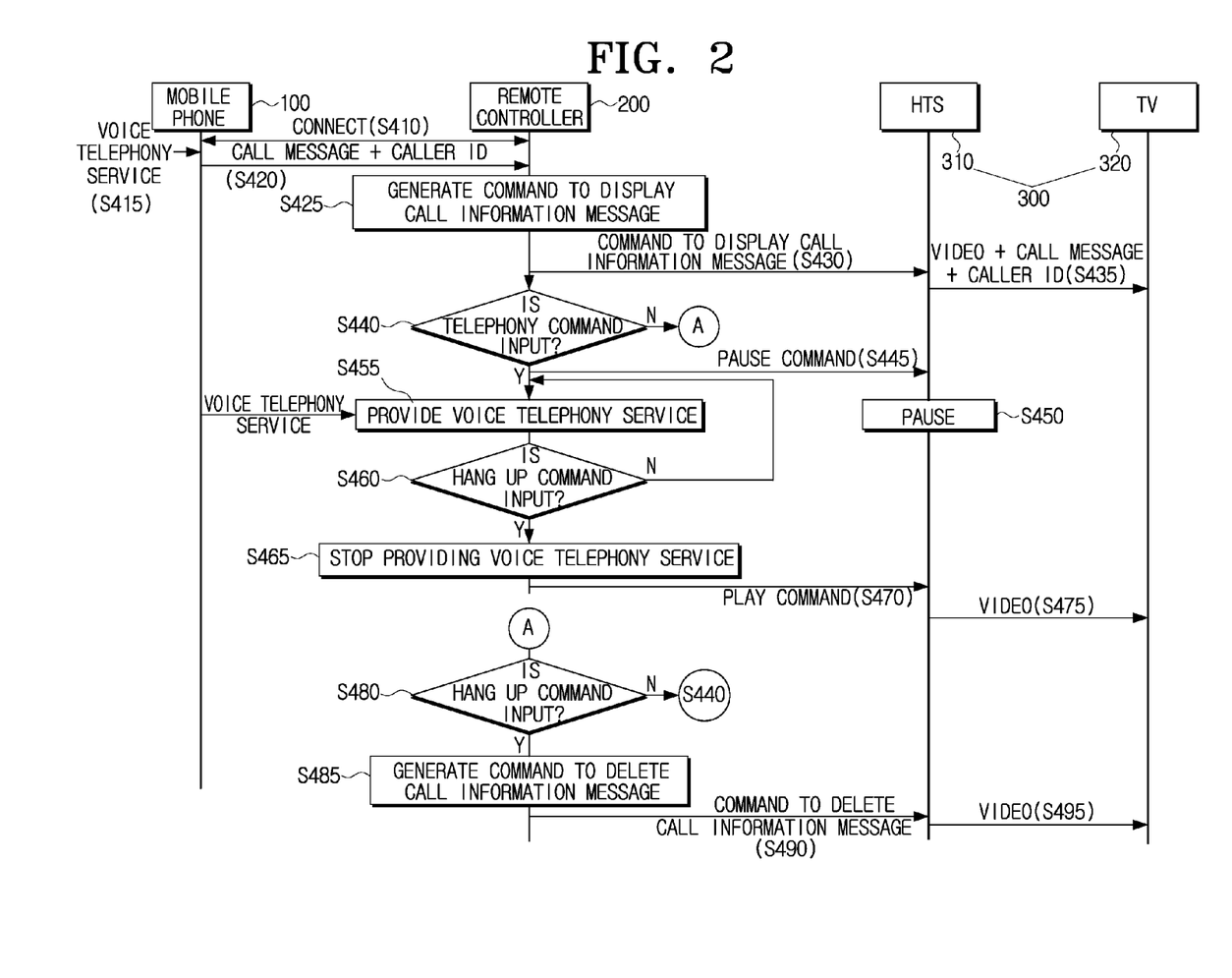
FIG. 2 is a view illustrating a process of providing entertainment in which the system of FIG. 1 is in association with a voice telephony service.

The process of operating the system of FIG. 1 when the mobile phone 100 receives the voice telephony service from the base station will be explained with reference to FIG. 2 in detail. FIG. 2 is a view illustrating a process of providing entertainment by the system of FIG. 1 in association with a voice telephony service.

Referring to FIG. 2, in operation S410, the mobile phone is connected with the remote controller 200 for Bluetooth communication. In operation S415, if the voice telephony service is received through the base station, in operation S420, the mobile phone 100 transmits to the remote controller 200 a message such as 'a call message' to inform a reception of a voice telephony service, and a caller identification (ID).

In operation S425, the remote controller 200 generates a command to display a call information message, and in operation S430, transfers the generated command to the HTS 310. The command to display the call information message includes the caller ID.

In operation S435, the HTS 310 adds the call message and the caller ID to a video being output to the TV 320 in an on-screen display (OSD) manner. The user recognizes the caller ID and that the voice telephony service is received to the mobile phone 100 through a screen of the TV 320.

In operation S440-Y, if a telephony command is input by the user through the remote controller 200, in operation S445, the remote controller 200 transfers a pause command to the HTS 310. In operation S450, the HTS 310 pauses transferring the video to the TV 320 in order to pause providing the entertainment service.

In operation S455, the remote controller 200 receives the voice telephony service from the mobile phone 100, and provides the user with the received voice telephony service. The user uses the phone through the remote controller 200, accordingly.

In operation S460-Y, if the user inputs a hang up command using the remote controller 200, and in operation S465, the remote controller 200 stops providing the voice telephony service. In operation S470, the remote controller 200 transfers a play command to the HTS 310. In operation S475, the HTS 310 continues to provide the entertainment service by transferring the video to the TV 320.

If the user does not input the telephony command (S440-N), but inputs the hang up command (S480-Y) after performing the operation S435, in operation S485, the remote controller 200 generates a command to delete the call information message, and in operation S490, transmits the command to delete the call information message to the HTS 310.

In operation S495, the HTS 310 transmits only the video to the TV 320. The call message and caller ID disappear from the screen of the TV 320.

Figure 3:
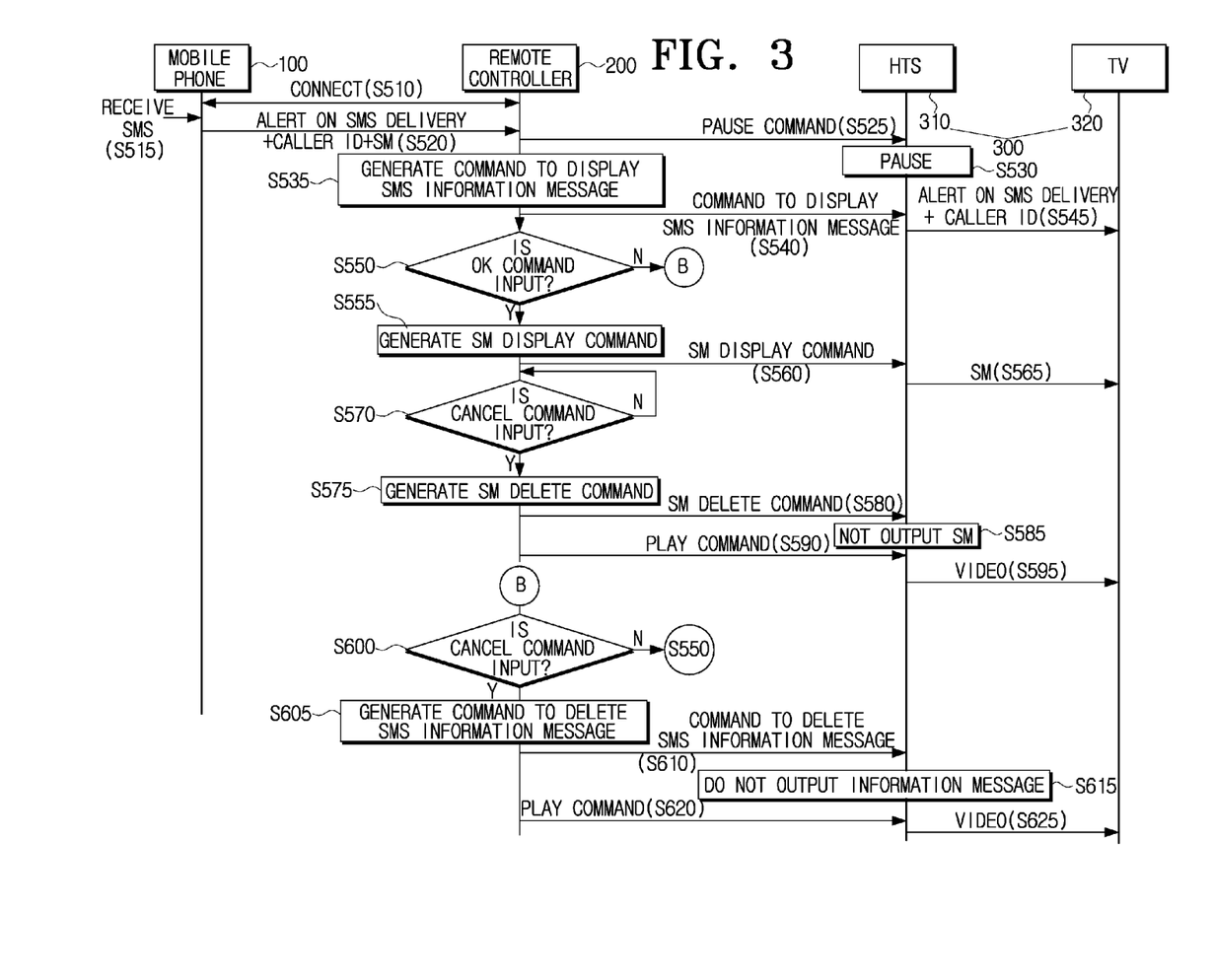
FIG. 3 is a view illustrating a process of providing entertainment in which the system illustrated in FIG. 1 is in association with a short message service (SMS)

The process of operating the system of FIG. 1 when the mobile phone 100 receives a SMS from a base station will be explained with reference to FIG. 3 in detail. FIG. 3 is a view illustrating a process of providing entertainment by the system illustrated in FIG. 1 in association with the SMS.

Referring to FIG. 3, in operation S510, the mobile phone 100 is connected with the remote controller 200 for Bluetooth communication. In operation S515, if the SMS is received through the base station, in operation S520, the mobile phone 100 transmits 'alert on SMS delivery,' 'caller ID,' and 'short message (SM)' to the remote controller 200.

In operation S525, the remote controller 200 transmits the pause command to the HTS 310. In operation S530, the HTS 310 pauses providing entertainment by pausing transmitting the video to the TV 320.

In operation S535, the remote controller 200 generates a command to display a SMS information message, and in operation S540, transmits the generated command to the HTS 310. The command to display a SMS information message includes a caller ID.

In operation S545, the HTS 310 outputs the 'alert on SMS delivery' and 'caller ID' to the TV 320. The user can recognize the caller ID and that the SMS is received to the mobile phone 100 through the TV screen.

In operation S550-Y, if the user inputs an OK command using the remote controller 200, in operation S555, the remote controller 200 generates an SM display command. The SM display command includes the SM.

In operation S560, the remote controller 200 transfers the generated SM display command to the HTS 310. In operation S565, the HTS 310 outputs the SM included in the SM display command to the TV 320. Accordingly, the user may check the SM received to the mobile phone 100 by viewing the TV 320.

In operation S570-Y, if the user inputs a cancel command using the remote controller 200, in operation S575, the remote controller 200 generates a SM delete command, and in operation S580, transfers the generated SM delete command to the HTS 310. In operation S585, the HTS 310 does not output the SM to the TV 320. The SM disappears from the TV screen.

In operation S590, the remote controller 200 transmits a play command to the HTS 310. In operation S595, the HTS 310 continues to provide the entertainment service by transferring the video to the TV 320.

If the user does not input the OK command (S550-N), but inputs the cancel command (S600-Y) after performing the operation S535, in operation S605, the remote controller 200 generates a command to delete the SMS information message, and in operation S610, transmits the command to delete the SMS information message to the HTS 310.

In operation S615, the HTS 310 does not output the SMS information message to the TV 320. The 'alert on SMS delivery' and 'caller ID' disappear from the TV screen.

In operation S620, the remote controller 200 transfers a play command to the HTS 310. In operation S625, the HTS 310 continues to provide the entertainment service by transferring the video to the TV 320.

Figure 4:
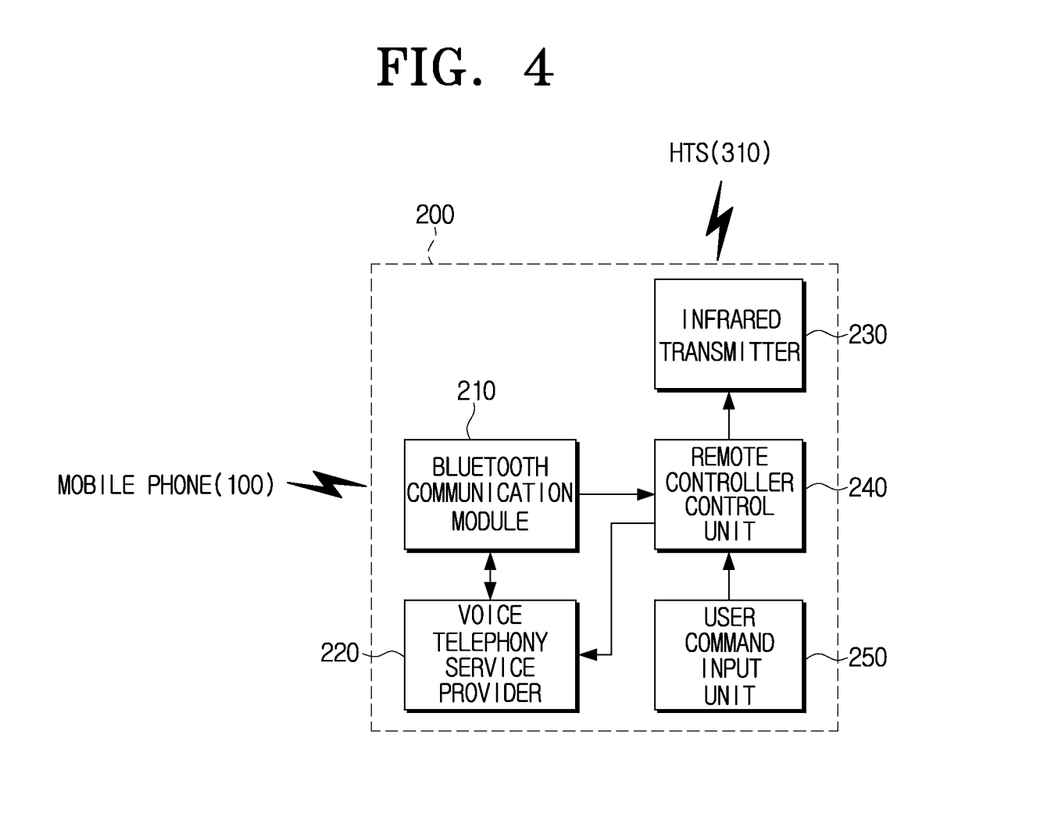
FIG. 4 is a block diagram illustrating a remote controller according to an exemplary embodiment of the present general inventive concept.

The remote controller 200 of FIG. 1 will be explained with reference to FIG. 4 in detail. FIG. 4 is a block diagram illustrating a remote controller according to an exemplary embodiment of the present general inventive concept.

Referring to FIG. 4, the remote controller 200 may include a Bluetooth communication module 210, a voice telephony service provider 220, an infrared transmitter 230, a remote controller control unit 240, and a user command input unit 250.

The Bluetooth communication module 210 is connected with the mobile phone 100 for Bluetooth communication. The Bluetooth communication module 210 receives a voice telephony service by communicating with the mobile phone 100 according to a Bluetooth hands-free profile.

The Bluetooth communication module 210 may receive an SMS from the mobile phone 100 according to Bluetooth communication.

The voice telephony service provider 220 performs functions required to provide a voice telephony service to a user through the remote controller 200. The voice telephony service provider 220 may include a speaker to output voice, a microphone to input voice, and a voice signal processor.

The voice telephony service provider 220 provides a voice telephony service received from the mobile phone 100, not from a base station, to a user. However, a method to provide the voice telephony service to the user is similar to that of the mobile phone 100.

The user command input unit 250 receives a command from the user, and transfers the received command to the remote controller control unit 240. The user command input unit 250 may be embodied using a physical user interface (PUI) such as a button, touch pad, or joystick.

The infrared transmitter 230 converts a control command transmitted from the remote controller control unit 240 into an infrared signal applying an IrDA standard, and transmits the converted signal to the HTS 310.

The remote controller control unit 240 generates a control command to control an operation of the HTS 310 according to the user command input through the user command input unit 250, and transmits the generated control command to the infrared transmitter 230.

If the remote controller control unit 240 receives a telecommunication service from the mobile phone 100, the remote controller control unit 240 generates a control command to pause providing an entertainment service provided from the HTS 310, and transfers the generated control command to the infrared transmitter 230.

The remote controller control unit 240 causes a user to recognize that a telecommunication service is received, and controls the remote controller 200 and the HTS 310 so that the user can use the telecommunication service through the remote controller 200 or the TV 320 connected with the HTS 310 as occasion demands, which will be explained below.

Figure 5:
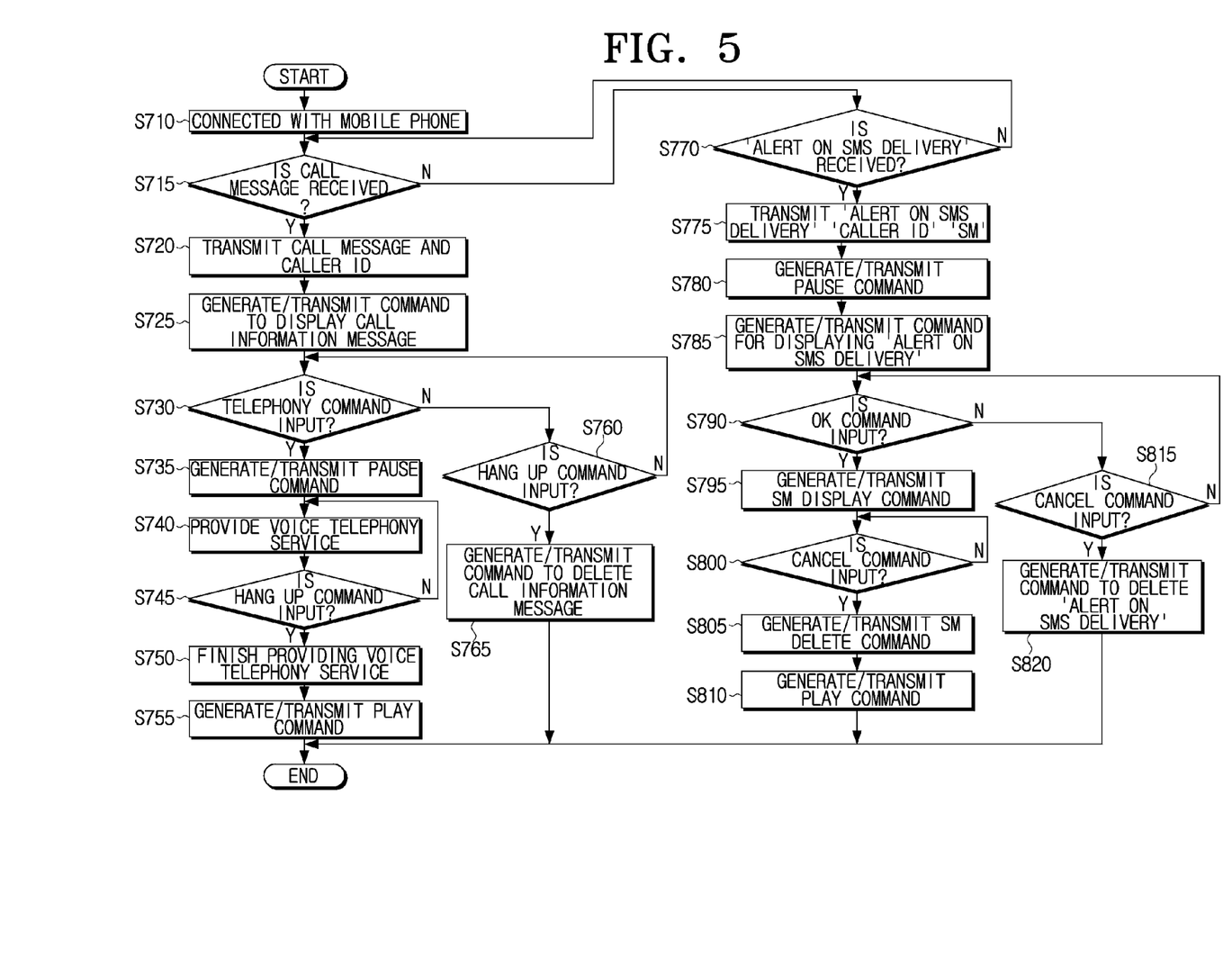
FIG. 5 is a flow chart illustrating an operation of the remote controller of FIG. 4.

FIG. 5 is a flow chart illustrating an operation of the remote controller of FIG. 4.

Referring to FIG. 5, in operation S710, the remote controller control unit 240 is connected with the mobile phone 100 via the Bluetooth communication module 210 for communication.

In operation S715-Y, the Bluetooth communication module 210 receives a call message and a caller ID from the mobile phone 100, and in operation S720, the Bluetooth communication module 210 transmits the received call message and caller ID to the remote controller control unit 240.

In operation S725, the remote controller control unit 240 generates a command to display the call information message including the caller ID, and transmits the generated call information message display command to the HTS 310 through the infrared transmitter 230. The HTS 310 displays the call message and caller ID on the TV 320, and so a user recognizes that the voice telephony service is being received.

In operation S730-Y, if the user inputs a telephony command through the user command input unit 250, in operation S735, the remote controller control unit 240 generates a pause command, and transmits the generated pause command to the HTS 310 through the infrared transmitter 230. The HTS 310 stops providing the entertainment service to the TV 320.

In operation S740, the remote controller control unit 240 controls the voice telephony service provider 220 to provide the user with the voice telephony service received through the Bluetooth communication module 210.

In operation S745-Y, if the user inputs a hang up command through the user command input unit 250, in operation S750, the remote controller control unit 240 controls the voice telephony service provider 220 to finish providing the voice telephony service.

In operation S755, the remote controller control unit 240 generates a play command, and transmits the generated play command to the HTS 310 through the infrared transmitter 230. The HTS 310 continues to provide the entertainment service to the TV 320.

If the user does not input the telephony command (S730-N), but inputs the hang up command (S760-Y) after performing the operation S725, in operation S765, the remote controller control unit 240 generates a command to delete the call information message, and transmits the command to delete the call information message to the HTS 310 through the infrared transmitter 230. The HTS 310 deletes the call message and caller ID from the TV 320.

In operation S770-Y, if the Bluetooth communication module 210 receives the 'alert on SMS delivery,' 'caller ID,' and 'SM' through the mobile phone 100, in operation S775, the Bluetooth communication module 210 transmits the received 'alert on SMS delivery,' 'caller ID,' and 'SM' to the remote controller control unit 240.

In operation S780, the remote controller control unit 240 generates a pause command, and transmits the generated pause command to the HTS 310 through the infrared transmitter 230. The HTS 310 pauses providing the entertainment service to the TV 320.

In operation S785, the remote controller control unit 240 generates a command to display a SMS information message including the caller ID, and transmits the generated command to the HTS 310 through the infrared transmitter 230. The HTS 310 displays the SMS information message and caller ID on the screen of the TV 320, and causes the user to recognize that the SMS is received.

In operation S790-Y, if the user inputs an OK command using the user command input unit 250, in operation S795, the remote controller control unit 240 generates an SM display command, and transmits the generated SM display command to the HTS 310 through the infrared transmitter 230. The HTS 310 displays the SM through the TV 320, and the user can check the SM received to the mobile phone 100 by viewing the TV screen.

In operation S800-Y, if the user inputs a cancel command using the user command input unit 250, in operation S805, the remote controller control unit 240 generates a SM delete command, and transfers the generated SM delete command to the HTS 310 through the infrared transmitter 230. The HTS 310 deletes the SM from the screen of the TV 320.

In operation S810, the remote controller control unit 240 generates a play command, and transmits the generated play command to the HTS 310 through the infrared transmitter 230. The HTS 310 continues to provide the entertainment service to the TV 320.

If the user does not input the OK command (S790-N), but inputs the cancel command using the user command input unit 250 (S815-Y) after performing the operation S785, in operation S820, the remote controller control unit 240 generates a command to delete the SMS information message, and transmits the command to delete the SMS information message to the HTS 310 through the infrared transmitter 230. The HTS 310 deletes the 'alert on SMS delivery' and 'caller ID' from the screen of the TV 320.

Figure 6A:
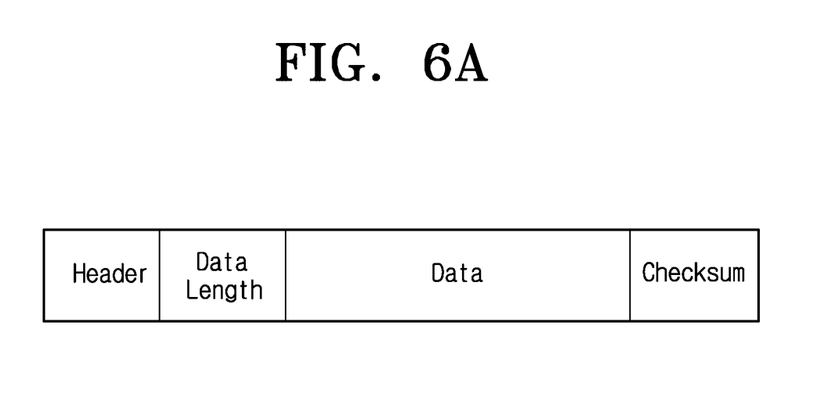
FIGS. 6A to 6C are views illustrating information/message and a format of a control command used when the remote controller of FIG. 4 performs the operation of FIG. 5.
Figure 6B:
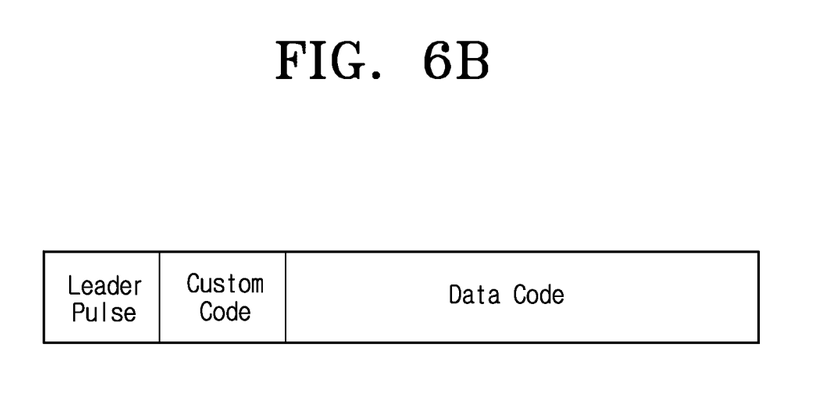
Figure 6C:
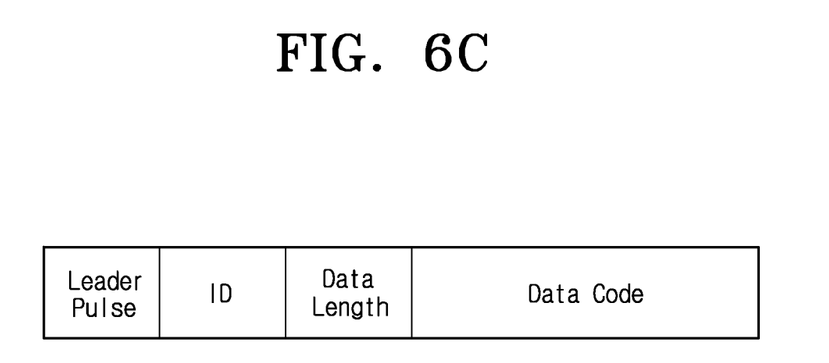

FIGS. 6A to 6C are views illustrating information/message and a format of a control command used when the remote controller of FIG. 4 performs the operation of FIG. 5.

Referring to FIGS. 4, 5 and 6A, a format of information/message which the Bluetooth communication module 210 transmits to the remote controller control unit 240 is illustrated. According to the exemplary embodiments of the present general inventive concept, the call message and caller ID in operation S720, and the 'alert on SMS delivery,' 'caller ID,' and 'SM' in operation S775 are described as the information/message transmitted from the Bluetooth communication module 210 to the remote controller control unit 240.

The information/message includes 'Header,' 'Data Length,' 'Data,' and 'Checksum' as illustrated in FIG. 6A.

The field 'Header' represents whether the information/message is associated with a telecommunication service. For example, if the field 'Header' has value 0x11, the information/message may be associated with a telecommunication service, and if the field 'Header' has value 0x22, the information/message may be associated with the others except for the telecommunication service.

The field 'Data Length' contains a length of field 'Data,' and the field 'Checksum' is used to detect or correct errors of the information/message.

The field 'Data' contains at least one of the 'call message,' 'alert on SMS delivery,' 'caller ID,' and 'SM.'

Referring to FIGS. 4, 5 and 6B, a format of a control command which the remote controller control unit 240 transmits to the HTS 310 (FIG. 1) is illustrated. The control command generated by the remote controller control unit 240 is converted into an infrared signal at the infrared transmitter 230 according to the IrDA method, and the converted signal is transmitted to the HTS 310.

According to the exemplary embodiments of the present general inventive concept, the pause command in operations S735 and S785, and the play command in operations S755 and S810 are described as a control command transmitted to the HTS 310 by the remote controller control unit 240.

Referring to FIG. 6B, the control command includes 'Leader Pulse,' 'Custom Code,' and 'Data Code.'

The field 'Leader Pulse' represents a beginning of the control command, and the field 'Custom Code' contains information about a manufacturer of the HTS 310 (FIG. 1) and remote controller 200.

The field 'Data Code' contains the control command which the remote controller 200 transmits to the HTS 310. For example, the field 'Data Code' may contain the play command and pause command.

The control command may be a control command which a user inputs through the user command input unit 250, also may be a control command which the remote controller control unit 240 automatically generates without the user input such as the commands in operations S735, S755, S780, and S810.

Referring to FIGS. 4, 5 and 6C, a format of a control command in association with a telecommunication service, and the control command is transmitted to the HTS 310 by the remote controller control unit 240 is illustrated.

The control command of FIG. 6C is similar to that of FIG. 6B, in that the control command is converted into an infrared signal according to the IrDA method, and the converted signal is transmitted to the HTS 310.

The control command of FIG. 6C is directly associated with a telecommunication service, and is not supported by a conventional HTS, while the control command of FIG. 6B is not directly associated with the telecommunication service, and is supported by the conventional HTS. The fields 'Leader Pulse' of both control commands are similar to each other, because the format of the control command of FIG. 6C is derived from the format of the control command of FIG. 6B. That is, the format of the control command of FIG. 6C is formed by changing the format of the control command of FIG. 6B.

The control command transmitted to the HTS 310 by the remote controller control unit 240 according to the exemplary embodiments of the present general inventive concept includes the command to display the call information message in operation S725, the command to delete the call information message in operation S765, the command to display a SMS information message in operation S785, the SM display command in operation S795, the SM delete command in operation S805, and the command to delete the SMS information message in operation S820.

The control command contains the fields 'Leader Pulse,' 'ID,' 'Data Length,' and 'Data Code' as illustrated in FIG. 6C.

The field 'Leader Pulse' represents the beginning of the control command, and the field 'Data Length' contains the length of field 'Data Code.'

The field 'ID' represents a type of the control commands. For example, if the field 'ID' has value 0x11, the control command indicates the command to display the call information message, if the field 'ID' has value 0x22, the control command indicates the command to delete the call information message, if the field 'ID' has value 0x33, the control command indicates the command to display a SMS information message, if the field 'ID' has value 0x44, the control command indicates the SM display command, if the field 'ID' has value 0x55, the control command indicates the SM delete command, and if the field 'ID' has value 0x66, the control command indicates the command to delete the SMS information message.

The field 'Data Code' contains data required to perform the command contained to the field 'ID.' The data in the field 'Data Code' are determined according to the command type in the field 'ID.' For example, the field 'Data Code' may contain the caller ID required to conduct the command to display a call information message and the command to display a SMS information message, or the SM required to conduct the SM display command.

Figure 7:
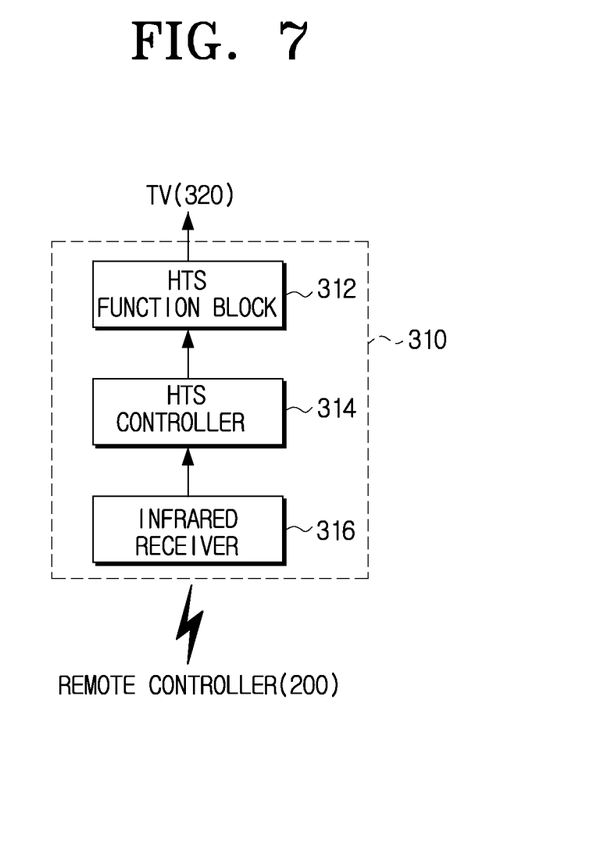
FIG. 7 is a block diagram illustrating a home theater system (HTS) according to an exemplary embodiment of the present general inventive concept.

The HTS 310 illustrated in FIG. 1 will be explained with reference to FIG. 7 in detail. FIG. 7 is a block diagram illustrating the HTS 310 according to an exemplary embodiment of the present general inventive concept.

Referring to FIG. 7, the HTS 310 may include a HTS function block 312, HTS controller 314, and an infrared receiver 316.

The HTS function block 312 performs proper functions for the HTS 310. That is, the HTS function block 312 replays a video recorded in a recording medium, and outputs audio and video through a speaker and the TV 320.

The infrared receiver 316 receives a control command transmitted from the remote controller 200, and transmits the received control command to the HTS controller 314.

The HTS controller 314 controls an operation of the HTS function block 312 corresponding to the control command received through the infrared receiver 316.

The control command in the exemplary embodiment of the present general inventive concept may include a pause command or play command, a command to display or delete a call information message, a command to display or delete a SMS information message, and a SM display command/SM delete command.

If the pause command or play command is received through the infrared receiver 316, the HTS controller 314 controls the HTS function block 312 to pause or provide an entertainment service.

If the command to display or delete a call information message is received through the infrared receiver 316, the HTS controller 314 controls the HTS function block 312 to display or delete the call message and caller ID on or from the screen of the TV 320.

If the command to display a SMS information message or the command to delete a SMS information message is received through the infrared receiver 316, the HTS controller 314 controls the HTS function block 312 to display or delete the SMS information message and caller ID on or from the screen of the TV 320.

If the SM display command or SM delete command is received through the infrared receiver 316, the HTS controller 314 controls the HTS function block 312 to display or delete the SM on or from the screen of the TV 320.

The exemplary embodiments of the present general inventive concept describe the process of providing an entertainment service to a user in association with a telecommunication service.

While the exemplary embodiments of the present general inventive concept employ the mobile phone 100 as an apparatus to transmit a telecommunication service to the remote controller 200, the mobile phone 100 is merely an exemplary embodiment of the present general inventive concept. Accordingly, other telecommunication apparatuses in addition to the mobile phone 100 are applicable to the present general inventive concept.

The telecommunication apparatus may be a personal digital assistant (PDA) having a Bluetooth module, or a general telephone receiving a telecommunication service through public switched telephone network (PSTN). The general telephone should mount the Bluetooth communication module.

When the mobile phone 100 having the Bluetooth module according to the exemplary embodiments of the present general inventive concept is substituted for the general telephone, the Bluetooth communication module 210 housed in the remote controller 200 communicates with the general telephone according to a Bluetooth cordless telephony profile (CTP), and receives a voice telephony service. The Bluetooth communication module 210 may receive the SMS from the general telephone according to the Bluetooth communication.

As the voice telephony service and SMS are merely an exemplary embodiment of the telecommunication service, other types of the telecommunication service such as a video telephony service may be applicable to the present general inventive concept.

While the entertainment system 300 of the exemplary embodiment of the present general inventive concept is embodied by a connection between the HTS 310 and the TV 320, this should not be considered limiting. The entertainment system 300 may be embodied by the connection of other types of electronic apparatus besides the HTS 310 and the TV 320. The apparatuses embodying the entertainment system 300 are not limited to two electronic apparatuses as the exemplary embodiments of the present general inventive concept. The number of electronic apparatuses to embody the entertainment system 300 is not limited.

According to the exemplary embodiment explained above, while a user uses a telecommunication service, for example, while a user is on the phone or checking the SM, the entertainment system 300 is controlled to pause providing the entertainment service. However, it is merely the exemplary embodiment of the present general inventive concept for convenient description. Accordingly, the entertainment system 300 may be controlled for other operations.

While the remote controller 200 according to the exemplary embodiments of the present general inventive concept converts the control command into an infrared signal, and transmits the converted signal to the HTS 310, the remote controller 200 is merely an exemplary embodiment of the present general inventive concept for convenient description. For example, the present general inventive concept is available to when a remote controller is embodied to convert the control command into a radio frequency (RF) signal instead of the infrared signal, and transmits the converted signal to the HTS 310.

According to the exemplary embodiments of the present general inventive concept, a portion of the telecommunication services transmitted from the mobile phone 100, for example the caller ID, is provided to a user, and when the user inputs the OK command, remaining portions of the telecommunication services, for example SM, are provided to the user. However, the portion of the telecommunication services is merely an exemplary embodiment of the present general inventive concept. Even when the user does not input the command, the remaining portions may be provided to the user after passing a predetermined time.

The present general inventive concept is also applicable to when the telecommunication service may be provided by more than three stages besides two stages.

The caller ID of the exemplary embodiments of the present general inventive concept is an exemplary embodiment of caller information. Other caller information such as call name or caller photo may be used in addition to the caller ID.

While the mobile phone 100 is connected with the remote controller 200 for Bluetooth communication, other types of connection may be applied.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, various embodiments of the present general inventive concept provide an entertainment service in association with a telecommunication service. Therefore, a user enjoying the entertainment service can more conveniently use the telecommunication service.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A remote control apparatus usable with a telecommunication and entertainment system, the apparatus comprising:
- a first interface to receive a telecommunication service from a telecommunication device that provides a user with the telecommunication service;
- a second interface to connect directly with an electronic device that provides the user with an entertainment service for communication and to transmit at least a portion of the telecommunication service from the remote control apparatus to the electronic device, the electronic device being separate from the telecommunication device; and
- a controller to transmit a first control command to the electronic device through the second interface to operate the electronic device while the user uses the telecommunication service, and, if a user inputs a command, to transmit a second control command associated with the telecommunication service transmitted from the telecommunication device through the first interface to the electronic device through the second interface, wherein the first control command is generated based on a type of the telecommunication service, and wherein the controller is configured to automatically transmit the telecommunication service from the remote control apparatus to the electronic device if a predetermined time has passed after receipt of the telecommunication service at the remote control apparatus without receipt of the command.

2. The apparatus of claim 1, wherein the second control command comprises:
at least one of a field indicating a type of the second control command and a field containing data required to conduct the second control command.

3. The apparatus of claim 2, wherein a first field of the first control command is identical to a first field of the second control command.

4. The apparatus of claim 1, wherein a format of the second control command is derived from a format of the first control command.

5. The apparatus of claim 1, wherein the second interface transmits the first control command and the second control command to the electronic device using one of an infrared signal and a radio frequency (RF) signal.

6. The apparatus of claim 1, wherein the telecommunication service comprises:
a voice telephony service and a short message service (SMS), and the telecommunication device comprises a general telephone and a mobile phone.

7. The apparatus of claim 1, wherein the first interface is connected with the telecommunication device for communication according to one of a Bluetooth hands free profile and a Bluetooth cordless telephony profile (CTP).

8. A remote control apparatus usable with a telecommunication and entertainment system, the apparatus comprising:
an input unit to receive a command from a user;
a first interface to receive a telecommunication service from a telecommunication device to provide the user with the telecommunication service;
a second interface connected with an electronic device to provide the user with an entertainment service; and
a controller to automatically transmit a first control command including a portion of the telecommunication service to the electronic device through the second interface, based on a type of the telecommunication service when the telecommunication service is received from the telecommunication device through the first interface, and if the command is input through the input unit, to transmit a second control command including remaining portions of the telecommunication service to the electronic device through the second interface
wherein the controller is configured to automatically transmit the telecommunication service from the remote control apparatus to the electronic device if a predetermined time has passed after receipt of the telecommunication service at the remote control apparatus without receipt of the command.

9. The apparatus of claim 8, wherein the portion of the telecommunication service comprises:
information about a caller of the telecommunication service, and the remaining portions of the telecommunication service comprise telecommunication content transmitted by the caller.

10. The apparatus of claim 8, wherein the second control command comprises:

at least one of a field indicating a type of the second control command and a field containing data required to conduct the second control command.

11. The apparatus of claim 8, wherein a format of the second control command is derived from a format of the first control command.

12. The apparatus of claim 11, wherein a first field of the first control command is identical to a first field of the second control command.

13. The apparatus of claim 8, wherein the telecommunication service comprises:
a short message service (SMS).

14. A remote control method, comprising:
automatically transmitting a first control command including a portion of a telecommunication service from a remote control to an electronic device, based on a type of telecommunication service when the telecommunication service is received at the remote control from a telecommunication device; and
if a user inputs a command, transmitting a second control command including remaining portions of the telecommunication service from the remote control to the electronic device,
wherein if a predetermined time has passed after the telecommunication service has been received at the remote control without receiving the command, automatically transmitting the remaining portions of the telecommunication service from the remote control to the electronic device.

15. The remote controlling method of claim 14, further comprising:
if the user inputs the command, transmitting to the electronic device a pause command to pause providing an entertainment service at the electronic device.

16. The remote controlling method of claim 14, further comprising:
if the user inputs a cancel command to stop the telecommunication service, transmitting to the electronic device a delete command to delete the portion of the telecommunication service.

17. A remote control apparatus usable with a telecommunication system and an entertainment system, the apparatus comprising:
an interface to receive telecommunication information corresponding to a telecommunication service; and
a controller to control an operation of the entertainment system to automatically stop providing an entertainment service and to transfer a control command including at least a portion of the telecommunication information from the remote control apparatus to the entertainment system, based on a type of the telecommunication service when the interface receives the telecommunication information and, if a user inputs a command, to transmit remaining portions of the telecommunication information,
wherein the user obtains the at least the portion of the telecommunication information through the entertainment system, and
wherein the controller is configured to automatically transmit the remaining portions of the telecommunication information from the remote control apparatus to the electronic device if a predetermined time has passed after receipt of the telecommunication information at the remote control apparatus without receipt of the command.

18. A remote control apparatus usable with a telecommunication system, the apparatus comprising:

an interface to receive a telecommunication service from one or more telecommunication devices; and a controller to automatically transmit a control command including a first set of telecommunication information corresponding to the telecommunication service from the remote control apparatus to an electronic device, based on a type of the telecommunication service when the interface receives the telecommunication service, and, if a user inputs a user command, to transmit a second set of the telecommunication information from the remote control apparatus to the electronic device in response to a user command, wherein the controller is configured to automatically transmit the second set of telecommunication information from the remote control apparatus to the electronic device if a predetermined time has passed after receipt of the telecommunication service at the remote control apparatus without receipt of the user command.

19. The apparatus of claim 18, wherein the user command is in response to the first set of the telecommunication information.

20. The apparatus of claim 19, wherein the first set of the telecommunication information comprises:
a call message.

21. A remote control method of a telecommunication system and an entertainment system, the method comprising:

receiving, by a remote control apparatus, telecommunication information corresponding to a telecommunication service; and controlling an operation of the entertainment system to automatically stop providing an entertainment service and to transfer a control command including at least a portion of the telecommunication information from the remote control apparatus to the entertainment system, based on a type of telecommunication service when an interface of the remote control apparatus receives the telecommunication information so that a user obtains the at least the portion of the telecommunication information through the entertainment system and, if the user inputs a command to the remote control apparatus, transmitting remaining portions of the telecommunication information;

wherein the controlling includes automatically transmitting remaining portions of the telecommunication information from the remote control apparatus to the entertainment system if a predetermined time has passed after the receiving, by the remote control apparatus, the telecommunication information without receiving the command.

22. A computer-readable recording medium having embodied thereon a computer program to execute a method, wherein the method comprises:

receiving, by a remote control apparatus, telecommunication information corresponding to a telecommunication service; and controlling an operation of an entertainment system to automatically stop providing an entertainment service and to transfer a control command including at least a portion of the telecommunication information from the remote control apparatus to the entertainment system, based on a type of telecommunication service when an interface of the remote control apparatus receives the telecommunication information so that a user obtains the at least the portion of the telecommunication information through the entertainment system, and, if the user inputs a command to the remote control apparatus, transmitting remaining portions of the telecommunication information;

wherein the controlling includes automatically transmitting remaining portions of the telecommunication information from the remote control apparatus to the entertainment system if a predetermined time has passed after the receiving, by the remote control apparatus, the telecommunication information without receiving the command.

23. A remote controlling method, comprising:

automatically transmitting a first control command including a portion of a telecommunication service from a remote control to an electronic device, based on a type of the telecommunication service when the telecommunication service is received at the remote control from a telecommunication device; and if a user inputs a command, transmitting a second control command including remaining portions of the telecommunication service from the remote control to the electronic device, wherein if a predetermined time is passed after receiving the telecommunication service at the remote control without the command, automatically transmitting the remaining portions of the telecommunication service from the remote control to the electronic device.

* * * * *